Feb. 25, 1958          S. K. WELLMAN          2,824,629
WELDED BRAKE SHOE ASSEMBLY
Filed Dec. 17, 1953          3 Sheets-Sheet 1
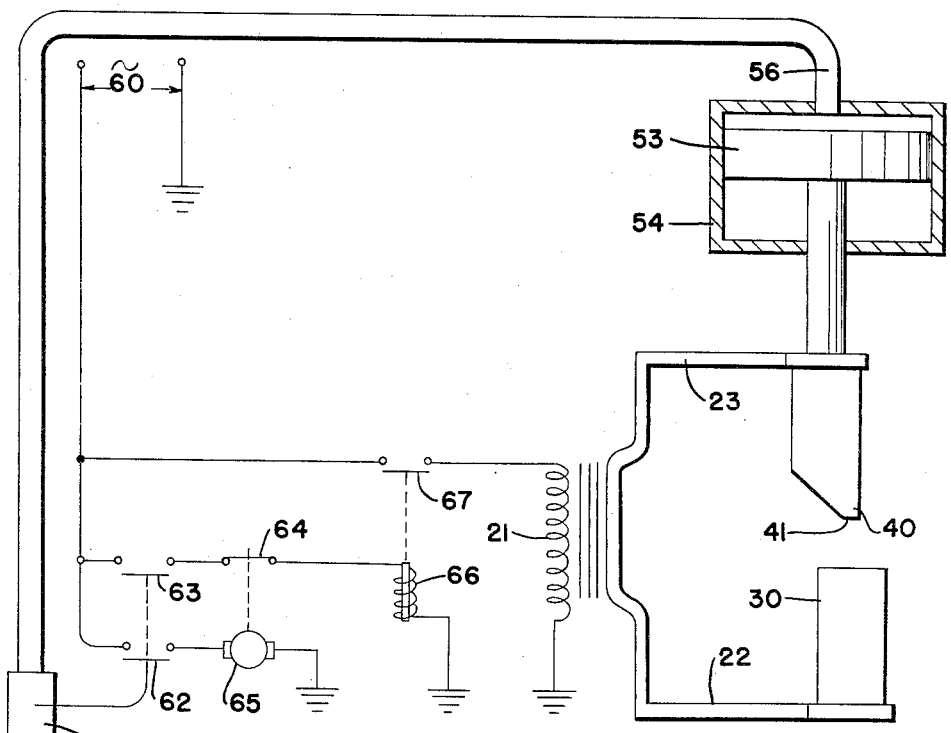
FIG.4
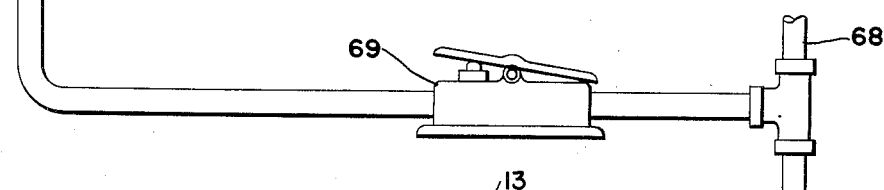
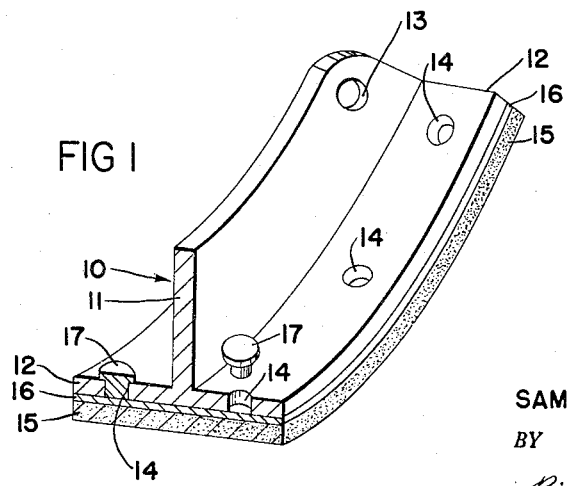
FIG 1
*INVENTOR.*
SAMUEL K. WELLMAN
BY
*Richard H. MacCutcheon*
ATTORNEY Feb. 25, 1958  S. K. WELLMAN  2,824,629
WELDED BRAKE SHOE ASSEMBLY
Filed Dec. 17, 1953  3 Sheets-Sheet 3

INVENTOR.
SAMUEL K. WELLMAN
BY Richard H. MacCutcheon
ATTORNEYS

United States Patent Office 2,824,629
Patented Feb. 25, 1958

2,824,629
WELDED BRAKE SHOE ASSEMBLY

Samuel K. Wellman, Cleveland Heights, Ohio, assignor to S. K. Wellman Company, Bedford, Ohio, a corporation of Ohio Application December 17, 1953, Serial No. 398,686

5 Claims. (Cl. 188—234)

This application is a continuation in part of my copending application S. N. 112,476, filed August 26, 1949.

This invention relates to brakes for use in checking and stopping the speeds of rotating members and particularly relates to arcuate vehicle brake shoe members and arcuate sintered powdered metallic linings or friction facings and to apparatus and methods for assembling such linings upon such shoe members.

The most common vehicle brake is of the type comprising a brake drum having a cylindrical braking flange and two internal-expanding arcuate brake shoes carrying friction linings adapted to be contacted with the braking flange of the drum by expansion or outward movement of each brake shoe. The shoes are generally formed of solid metal such as steel or aluminum alloys and provided with friction linings of non-metallic materials such as asbestos with a rubber or other plastic binder. The lining is secured to each shoe by rivets extending through both the shoe and lining or by adhesive bonding. Adhesive has the disadvantage of requiring long processing time (e. g., for baking) and adhesive has the further disadvantage of interfering with heat transfer and the use of rivets is disadvantageous because of poor heat transfer and because, when the lining becomes worn, the rivets become exposed and score the inner surface of the brake drum and also because a riveted lining is likely to break at any time across rivet openings and injure or ruin the lining, and the cooperating brake drum.

Further, the non-metallic friction linings are subject to numerous disadvantages, for example, they have their characteristics greatly changed by contact with oil, grease, or water, have their characteristics greatly changed by temperature and are unable to conduct away the heat generated during operation. In some cases heating of the fabric lining is sufficient to melt or fuse the bonding components and completely destroy the anti-friction properties of the lining.

Friction articles of powdered predominantly metallic material, sintered and bonded to a metallic backing member, are well known to the art and have numerous advantages over fiber facings, the sintered facings being less susceptible to changes in temperature and atmospheric conditions, less affected by oil, grease and foreign matter, much more conductive of heat, and showing less wear with the same use.

Friction articles of the type referred to are produced by pressing or briquetting powders of suitable composition usually comprising metals predominantly and containing minor amounts of non-metallic ingredients such as graphite. The briquette or compact so formed is later heated to a sintering temperature, but because the metal powder even when sintered is rather porous and of low tensile strength, it is customary to provide a reinforcing backing plate as of steel and generally the sintering step is accomplished with the briquette held against a clean and properly prepared surface of the backing plate. The heat of the sintering step causes the pressed powder to sinter together and to integrally bond to the backing plate.

While the properties including good heat conductivity of sintered metallic linings, unaffected as they are by contact with liquids or by variations in temperatures, pressures or speeds, would appear to admirably adapt them to vehicle brake uses, it has not been found feasible heretofore to do so due to the difficulty of properly designing a brake member, the difficulty of working or machining the sintered metal compositions, and particularly due to the difficulty of providing a removable bond between a brake shoe and a sintered metallic lining.

Due to lack of tensile strength, the sintered materials are so brittle that attempts made to rivet them to a brake shoe by rivets extending through or beneath the material have not been successful, for the material is either broken during the drilling of holes for rivets, or during the riveting operation, or it quickly breaks in service, the breaks usually occurring at the rivet holes. Further, this same lack of tensile strength prevents the metallic friction materials from being readily bent to shape so that, unlike asbestos, they cannot be merely bent around an arcuate surface and simply secured thereto by heretofore known methods.

While, attempts to preform or roll bend the sintered facing and its bonded backing, before attaching them to the shoe, have been previously known, e. g., as described and claimed in U. S. Patent 2,446,891, entitled "Method of Shaping Bimetallic Articles" and issued August 10, 1948, upon an application filed by Charles H. Tower and Francis J. Lowey, still there arises the problem of attachment, rivets not being satisfactory for reasons previously explained, adhesive bonding not being saisfactory from the standpoint of strength and of difficulty of removal and of so seriously interfering with heat conductivity as to negative one of the most important advantages of the predominantly metallic facing material, and welding (either by tack welds at the sides of facing and shoe or throughout the contiguous lengths of facing, or its immediate backing, and the shoe member) presenting difficulties in many applications from the standpoint of processing time and expense and insuperable maintenance difficulties because an old lining or its backing, if so welded, cannot be ripped off of the shoe when a new one is to be put on in its place.

It is an object of the present invention to provide simple and inexpensive means for overcoming the above mentioned difficulties.

A further object of the invention is to provide a new and improved internal-expanding brake shoe and lining assembly for use in vehicle brakes and characterized by an integral imperforate friction surface.

Another object of the invention is to provide a novel brake shoe having a sintered predominantly metallic friction surface and characterized by great strength, relatively low weight, smooth friction surface, and easy removal for maintenance purposes.

Other objects and advantages will become apparent and the invention may be better understood from consideration of the following description taken in connection with the accompanying drawing, in which:

Fig. 1 is a perspective view of a portion of a brake shoe and sintered powdered predominantly metallic brake lining assembly being attached thereto in accordance with the invention;

Fig. 4 is a diagram of an electric and pneumatic circuit found useful in connection with the apparatus and according to one aspect of the method of the invention.

Figure 2:
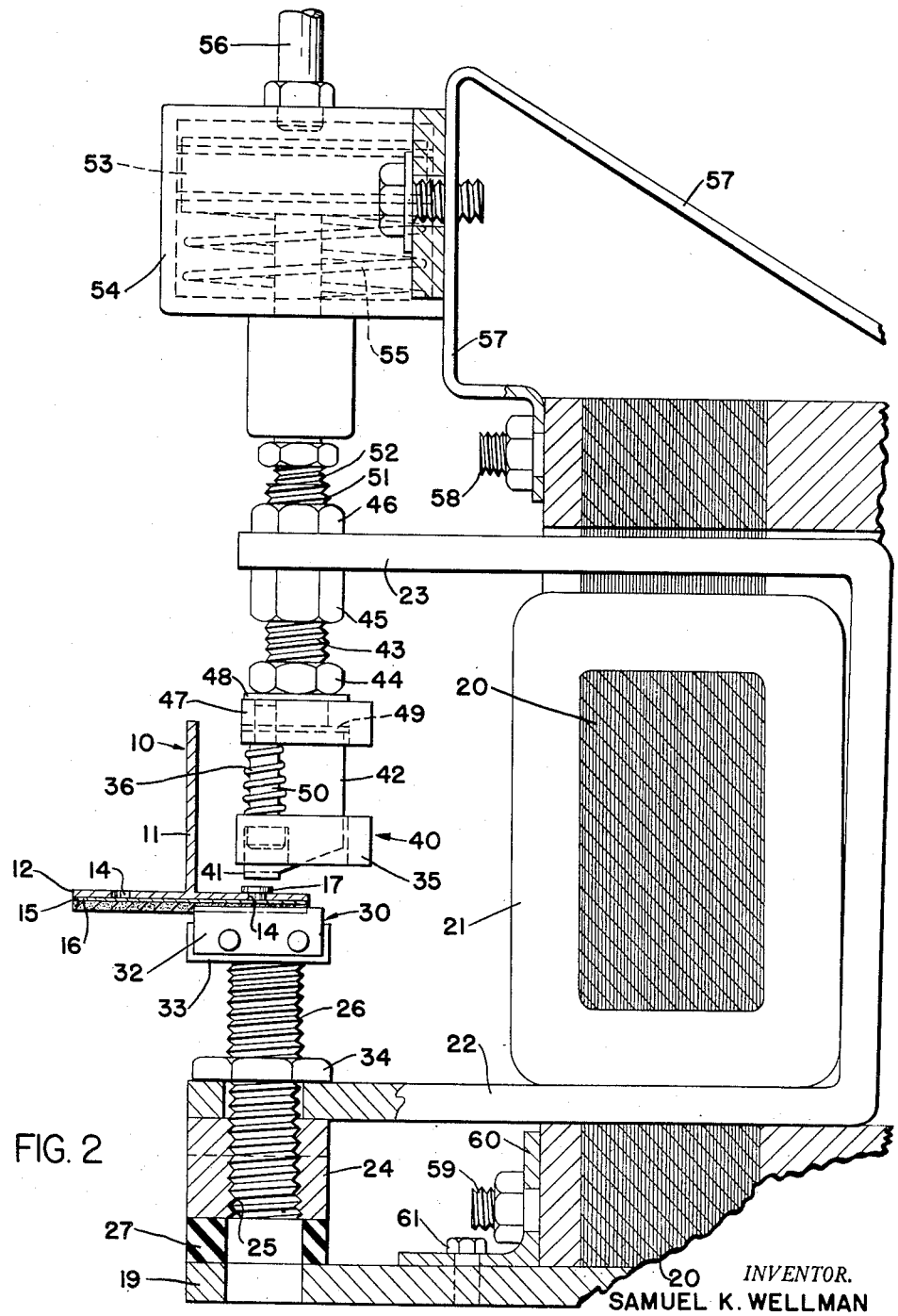
Fig. 2 is a diagrammatic side view (partly in section) of a welding apparatus showing a method of attaching the sintered brake lining and brake shoe in accordance with the invention.

Referring now to Figs. 1 and 2, there is shown a brake shoe member 10 which comprises a web plate 11 curved edgewise and a thick flange portion or sole plate 12 curved flatwise and conforming to the curvature of a brake drum (not shown). The brake shoe member 10 which thus is of T-shape in cross section, constitutes one of the usually two expanding brake shoes for one of the brake drums of a motor vehicle. The web plate 11 is provided with one or more openings 13 for attachment of brake shoe actuating mechanism as is usual in such construction. The flange 12 at each side of the web 11 is provided with openings 14 for receiving novel brake lining fastening means as will be described. The openings 14 may be the usual holes for usual rivets, allowing the use of a standard brake shoe in practicing the invention even though a "riveted" lining is not to be used.

In accordance with the stated objects, a sintered predominantly metallic mixture of friction materials 15 is to be secured to the above described brake shoe member 10.

It has been found essential that sintered compositions useful as friction surfaces on brake lining members be produced in flat form if they are to have uniform properties. Articles of large area such as are required for brake linings must be pressed and pressed flat if they are to have uniform density, hardness and friction properties. In accordance with prior practices, such flat pressed shapes may then be assembled on a clean and properly prepared surface of a flat steel backing member and the assembly then pressed and heated to a sufficient temperature and for a sufficient length of time to sinter the pressed mixture and cause it to integrally bond to the steel backing. To achieve the proper bond it is necessary that the pressed mixture and the steel backing be held together while flat and under pressure. The unitary article (of friction facing bonded to a steel backing) thus produced is now a flat straight member and is in condition to be made to conform to the brake shoe to which it is later attached. Of course, it is much too stiff (and breakable) to be wrapped around by hand like an asbestos lining. Due to the abrasive character of the friction producing materials in the friction facing mixture, it is practically impossible to machine or grind the resultant article to curved shape, and because of the low tensile strength of the sintered metal brake lining 15 it is not possible to bend this lining by resorting to the usual bending press for in such bending the sintered surface would chip and crack badly because of its low tensile strength. But, by passing the flat brake lining with its steel backing member (16) between pressure rolls, see for example the apparatus described in the above mentioned patent, the sintered brake lining 15 and its steel backing member 16 may be caused to conform to the curvature of the convex brake shoe 10 by applying pressure to laterally extending areas of bonded facing and backing successively and progressively along their lengths.

In accordance with the present invention, the steel backing member 16 and consequently the friction facing 15, is held in place on the brake shoe and then secured to the brake shoe 10 by welds performed in the holes 14. In the illustrated embodiment the welds are made by using pins 17 one in each of these holes. Preferably, the pins are slightly smaller than the holes so that the pins will not weld to the sides of the holes 14 to any great extent.

The pins 17 are attached or applied one at a time beginning at the center of the brake shoe on one side of the web and working from the center toward the ends and then repeat on the other side of the web. When the lining requires replacing, the lining and backing members are torn from the brake shoe and the pins forced out of the openings in the brake shoe flange and new lining is then attached as originally applied.

I do not mean to limit the present invention to a case where the pins are preheaded (like the pin 17 to the right of flange 11 in Fig. 1) for I have found that good results can be obtained when using straight sided pins and then depending upon upsetting to form heads during the welding operation. On the other hand, ordinary rivets (i. e., headed pins) may be used but they are used not at all like rivets in ordinary practice, for while a rivet head may be used to secure a headed pin 17 to the face of flange 12, without the necessity of making a weld or upset at this point, the inner-most end of such a "rivet" obviously cannot be peened over as in ordinary riveting, and, instead, it is "pin welded" to the adjacent backing, at the side of the latter opposite the friction facing.

Alternatively, pins need not be used at all for I have found it feasible to merely use an ordinary welding rod, strike an arc in each "rivet hole" and fill the hole with molten material. However, the pin welding method is preferred, because during production it assures consistently good welds, together with feasibility of later removal of weld fastening lining. Of course, it is apparent that this is a matter controlled by the size of the pins, the amount of current used in the welding operation and the surface condition of the holes in the brake shoe. A slight welding to the brake shoe is not objectionable and may even be beneficial. However, the welding time and current should not be so severe as to render the entire pin body molten, so that it will weld against the sides of the opening 14 and prevent ready removal of pins and lining. Too secure a welded joint between pin and shoe might result in bending and destruction of the shoe in removing the pin and thus prevent its re-use.

As seen in Fig. 2 the superposed brake shoe 10 and lining and backing assembly 15—16, with one or more pins 17 inserted, is placed in a welding apparatus comprising a base support 19 which carries a laminated core 20 surrounding a primary winding 21 and a secondary winding 22. Primary voltage may be 220 volts, A. C., and although it depends on the size of the pins, for steel rivets, 0.155" in shank diameter, the secondary or welding voltage of the welder may be as follows:

Secondary voltage_____volts__ 3.1
Time of weld_____second__ 0.10

Figure 3:
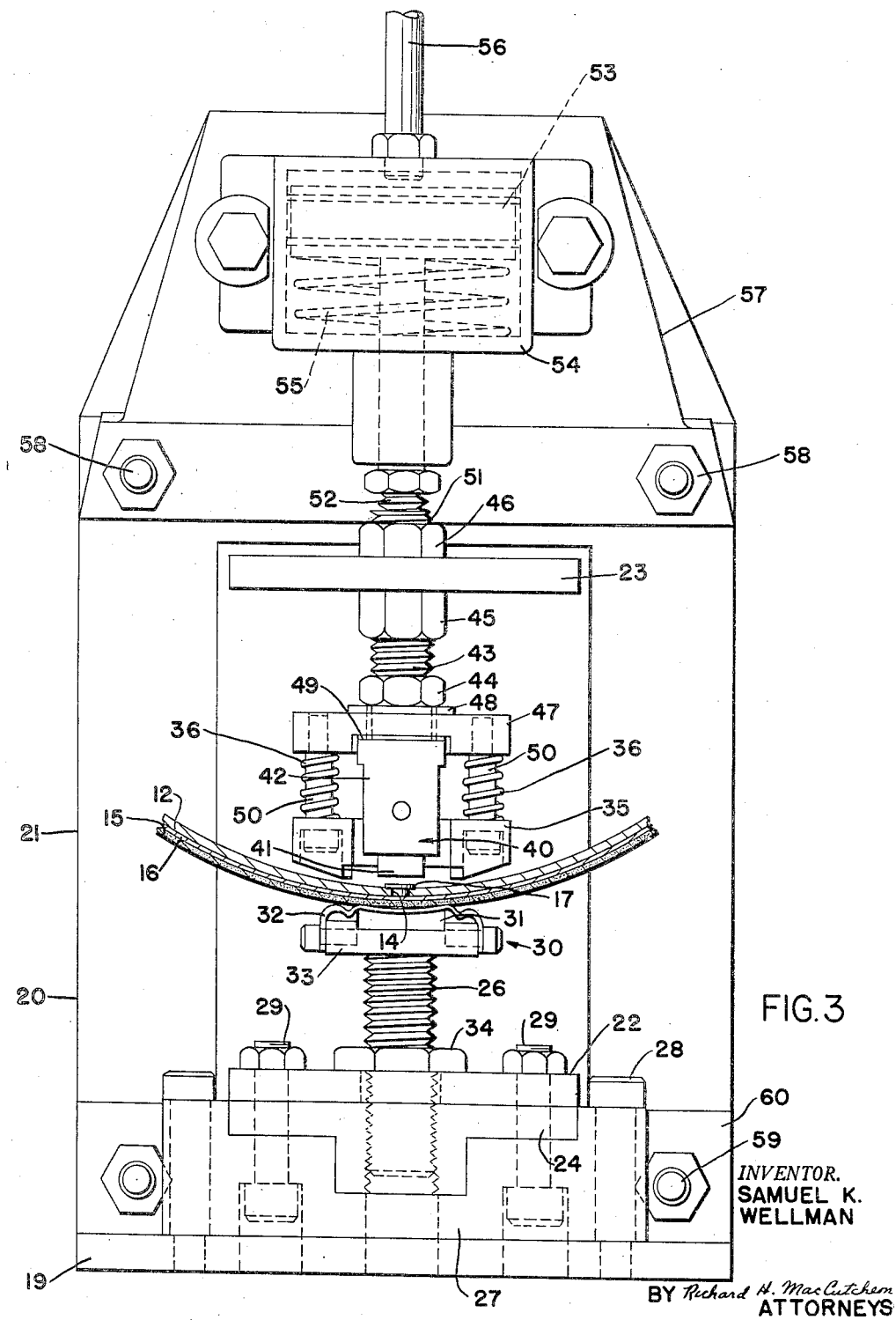
Fig. 3 is a front view of the welding apparatus of Fig. 2.

The secondary coil 22—23 is composed of a single part turn or coil formed as a horizontally arranged U with one arm (23) vertically above the other. The U is resilient and normally holds the upper arm 23 in its uppermost position when a piston is released as will presently appear. The lower arm 22 is stationary and passes through an opening in the core 20 beneath the primary coil and seats on a metallic block 24 which may be made of steel and is provided with internal threads 25 for receiving a lower welding electrode adjusting stud 26. Block 24 is seated upon an insulated block 27 which is secured to the base 19 by bolts 28 (see Fig. 3). As is also shown in Fig. 3, the secondary lower stationary arm 22, the block 24 and the insulating block 27 may be held together by bolts 29.

A lower fixed welding electrode indicated generally at 30 comprises a deformable rubber cushion 31 covered by a resilient strap 32 of a conductive metal such as copper, with deformable cushion and resilient strap being contained in and upon a metal cup 33 which is mounted upon or formed integral with the adjusting stud 26. A jam nut 34 is used for locking this fixed electrode at any predetermined position.

An upper movable terminal indicated generally at 40 is attached to the upper secondary arm 23 and comprises an electrode 41 of conductive metal held (as by a Morse taper) in a metallic holder 42 which in turn is supported by an adjusting stud 43 which is externally threaded and provided with a lock nut 44 for adjustably securing the terminal assembly to the stud. Additional lock nuts 45, 46 adjustably secure the secondary upper arm 23 upon the stud.

Because it is desired to clamp the brake shoe flange 12, and the lining 16 and its backing 15, securely without subjecting these members to any current except that passing through an individual pin 17, the upper electrode assembly also has a bifurcated metallic clamp 35 biased downward by helical springs 36 away from a metallic support member 47 which is insulated from the electrically operative part of the assembly by insulating washers 48 and 49. Stripper bolts 50 serve to laterally locate the springs 36 and have their main shanks forming a clearance with holes provided therefor in clamp 35 and reduced diameter threads securing these bolts to support member 47.

The externally threaded upper terminal adjusting stud 43 is bored out and internally threaded at its upper end 51 to accommodate a threaded end 52 of a piston rod attached to a piston 53 contained in a fluid pressure cylinder 54 and in which the piston may be normally biased upward by a helical spring 55. A fluid pressure conducting conduit 56 leads to the top of the cylinder housing 54. As shown in the drawing the cylinder housing is supported by a bracket 57 which is secured to the main assembly as by bolts 58 which also serve to hold the laminations together at their tops. At their bottoms the laminations are held together by bolts 59 which engage support angles 60 which in turn are fastened by other bolts 61 (Fig. 2) to the base 19.

From the above it will be apparent that suitable means are provided for clamping the work to be welded between the terminals of the welder. Suitable means are also provided for applying welding current almost immediately thereafter as may be understood from reference to Fig. 4 in which is diagrammatically shown conduit 56 tapped into a house line 68 of fluid pressure (such as a 90 p. s. i. compressed air line) with a foot valve 69 interposed between the source and the cylinder. Interposed between foot valve 69 and the cylinder 54 is a pressure responsive electric circuit making switch 70. Preferably, the pressure response value of the pressure responsive switch is such that piston 53 will have practically completed its movement responsive to pressure introduced as the foot valve 69 is operated before the pressure will have built up sufficiently for switch 70 to close the associated circuits.

The equipment is powered from a main line 60 (e. g., of 60 cycle, 220 volts) and when pressure switch 70 closes its contacts 62—63 conducts current through normally closed contact 64 of a timer 65 to energize a solenoid coil 66 to close a main contact 67 and energize the primary winding 21 and, consequently, the secondary circuit. After a predetermined time interval (such as the .025 second previously mentioned) timer 65 which has been energized through the auxiliary contact 62 (on pressure switch 70) operates to open the circuit to solenoid coil 66 and deenergize primary winding 21 and secondary windings 22—23.

When it is desired to attach a brake lining assembly 15, 16 to a brake shoe flange 12 the assembly is pushed against the brake shoe with the convex side of the flange facing downward and with one of the flange openings 14 directly above the lower electrode as shown in Figs. 2 and 3. The brake shoe and lining are clasped together in vertical relation, first by the hand of the operator and later, as the foot switch is operated, by the upper resiliently mounted clamp 35 and by the lower resilient electrode assembly 30, with both the upper and lower clamping members conforming to the arcuate shape of the work. Of course, before the mechanical clamping takes place, a welding pin or stud or headed rivet 17 will have been pushed into a hole 14 with its lowermost end against the upper surface of the backing member 16 and with its upper end directly beneath the upper electrode 41. As compressed air is admitted to the cylinder 54, the pin 17 is clamped against the steel backing member 13, and then the welding circuit fires and during the instant between the time that the main contact 67 is closed and the normally closed timer 64—65 is opened, the current from the line 60 energizes primary winding 21, energizing the secondary 22—23 and causing a welding current to pass through the electrode for a fraction of a second thus welding the adjacent end of the pin 17 to the steel backing member 16.

Sintered predominantly metallic brake linings with their steel backing members bent to conform to the flange of a brake shoe are now adapted to be supplied to the trade as separate articles of manufacture and may be easily and readily attached to the flanges of brake shoes by any ordinary mechanic with the aid of a pin welding machine of the type described. The attaching of the brake lining to the brake shoe merely involves properly positioning the brake shoe on the brake lining between the two electrodes with the concave side uppermost then putting a pin through a hole in the brake flange, resting it against the backing member, applying pressure to the pin and simultaneously or sequentially closing an electric circuit through the pins separately one at a time for welding the remote end of each pin to the backing member and (if straight sided pins are used) for upsetting the inner end of the pin.

Since the electrical demand of the welding apparatus described is comparatively small, it is inexpensive to install and may be operated on the conventional current usually found in almost any shop associated with gasoline filling stations and the like. With it, practically any workman can easily and quickly change or install new metallic brake linings on brake shoes for most types of automobile brakes. Since the sintered brake lining is not perforated or its surface broken in attaching the same to the brake shoe, the brake lining is very enduring and lasting as well as being very efficient in checking and stopping the speed of automobiles and like vehicles on which it is installed.

With the brake shoe mechanism disclosed in the present application, and also with brake shoe mechanism described and claimed in my above mentioned copending application, of which this is a continuation in part, the brake lining comprises a backing member to which is bonded by heat and pressure a layer of sintered powdered material predominantly metallic and the backing member is in turn attached to a brake shoe member by rigid metallic means requiring the use of welding apparatus. The arrangement of the invention of the present application uses two backing members, one immediately back of the sintered material and the other (an integral or component part of the shoe member) being provided with holes through which welded means extend to be welded to the first mentioned backing at its side opposite the side to which the sintered material is bonded. This makes possible the ready removal and replacement of worn brake lining without the disadvantages of rivets extending through the lining or its immediate back. Thus, there need be no interruption of the continuity of the friction surface of the brake lining and as a result the lining does not normally wear out so fast or break so soon, because the sintered friction surface is smooth and unbroken, that is, it is not penetrated by pins, rivets, or other fastening means that are conducive to chipping or fracturing of the sintered surface of the lining, or to scoring of the brake drum. Further, the arrangement of the invention prevents distinct advantages both from the standpoint of heat transfer during operation and later when the time comes for lining replacement because the "pin welded" backing is easy to strip off (with a chisel or large pliers), whereas ordinary welds suitable for an application of the type described are very stubborn and just about impossible to break or remove when it comes time to remove them in order to present clean surfaces for replacement purposes, and ordinary adhesives are also stubborn and require long periods of soaking and scraping in order to remove them.

The arrangements of the invention make it possible to weld together plates of any thickness because it is not necessary to use a pressure sufficient to deform the plates in order to pinch them together at the weld points. The process and apparatus of the invention makes it possible to weld without protecting the eyes (because the weld is not exposed), makes it possible to weld with very low current values, and, insofar as brake linings are concerned, makes it possible to have quieter brakes (because of more secure fastening), makes it possible to have longer wearing brakes (because of better heat conduction and no rivets or perforations in the lining), and eliminates the need for drilling or otherwise providing holes or indentations in a brake lining.

The invention has been described with particular reference to vehicle brakes having outwardly expanding shoes but it is apparent that the invention is not so limited and applicable to other applications, for while I have illustrated and described a particular embodiment, various modifications may be made without departing from the true spirit and scope of the invention as defined in the accompanying claims which are intended to include all reasonable equivalents.

I claim as my invention:

1. As an article of manufacture, a metallic brake shoe assembly comprising an imperforate predominantly metalic sintered brake lining having a metallic backing plate integrally bonded thereto substantially co-extensive therewith, a web plate curved edgewise and disposed in a single plane, a flange portion disposed in part-cylindrical curvature and formed integral with the convex edge of the web plate, with said metallic backing plate being curved similarly to said flange portion and with the flange perforated and pins extending through the flange portion perforations welded to the backing plate for removably securing the backing plate to the flange portion.

2. In a braking device, a brake shoe member T-shape in cross section comprising a flat arcuate metallic web plate forming the stem of the T, and forming the head of the T a rigid flange portion, a relatively flexible metallic backing, and a sintered body of metallic and non-metallic powders, with the flange portion conforming to the curvature of the web plate and rigidly secured thereto and extending to either side thereof and having perforations at either side of the flange plate, the backing member curved flatwise to conform to the curvature of the flange portion and welded thereto at the perforations by pin welding means comprising headed rivets having their shanks extending through the perforations, and the sintered body being bonded to the backing member to form an imperforate brake lining layer.

3. A braking device as in claim 2, further characterized by the imperforate outer brake lining layer being continuous and uniform in thickness and bonded to the backing member substantially continuously throughout the entire engaged surfaces of both.

4. A brake shoe and lining assembly of the type having a friction facing comprising a mixture of sintered metallic and non-metallic powders integrally bonded to a metallic backing member and having a brake shoe support member comprising a web extending at right angles to said facing and backing member, in which said friction facing is imperforate, continuous and uniform in thickness, in which the support member comprises a web portion curved edgewise and a perforated flange disposed in part-cylindrical curvature and integral with the convex edge of the web portion, in which the backing member is curved similarly to the flange portion, and in which pins are welded in the flange portion perforations so as integrally to bond the backing member to the support member.

5. As an article of manufacture, a composite metallic brake shoe for automotive brakes of the type having a cylindrical brake drum adapted to enclose a plurality of internal expanding brake shoes of T-shaped transverse cross section; said shoe consisting of a relatively flat, rigid, arcuate web plate forming the stem of the T and having at least one opening therethrough for the attachment of brake operating means, a relatively thick, rigid self supporting sole plate arcuately curved around the outer edge of said web plate and forming the head of the T with the inner concave surface of said sole plate directly and permanently attached to said web plate and said sole plate having openings extending therethrough on either side of the web plate; in combination with an external convex friction facing assembly comprising a relatively flexible imperforate backing plate of solid metal and bonded thereto under heat and pressure an imperforate porous predominantly metallic sintered layer of homogeneous composition throughout extending continuously and uninterruptedly across the convex external face of said sole plate; together with welding means extending through said openings in sole plate and extending to a welded engagement with said relatively flexible backing plate at the face thereof opposite the face to which said predominantly metallic sintered layer of homogeneous composition is bonded.

References Cited in the file of this patent

UNITED STATES PATENTS

| | | |
|---|---|---|
| 1,174,446 | Rietzel | Mar. 7, 1916 |
| 1,756,936 | Bendix | May 6, 1930 |
| 1,762,694 | Long et al. | June 10, 1930 |
| 1,864,929 | Peterson | June 28, 1932 |
| 1,907,483 | Blume | May 9, 1933 |
| 1,909,256 | Emmord | May 16, 1933 |
| 1,946,061 | Budd | Feb. 6, 1934 |
| 2,057,753 | Whitworth | Oct. 20, 1936 |
| 2,067,363 | Waeschle | Jan. 12, 1937 |
| 2,277,107 | Imes | Mar. 24, 1942 |
| 2,381,941 | Wellman et al. | Aug. 14, 1945 |